US012285962B2

(12) United States Patent
Shibagaki et al.

(10) Patent No.: US 12,285,962 B2
(45) Date of Patent: Apr. 29, 2025

(54) THERMOSENSITIVE RECORDING MATERIAL

(71) Applicant: Nippon Kayaku Kabushiki Kaisha, Tokyo (JP)

(72) Inventors: Kousuke Shibagaki, Fukuyama (JP); Yousuke Toda, Fukuyama (JP); Hidehiro Arai, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 179 days.

(21) Appl. No.: 18/022,632

(22) PCT Filed: Aug. 27, 2021

(86) PCT No.: PCT/JP2021/031491
§ 371 (c)(1),
(2) Date: Feb. 22, 2023

(87) PCT Pub. No.: WO2022/045287
PCT Pub. Date: Mar. 3, 2022

(65) Prior Publication Data

US 2023/0311554 A1 Oct. 5, 2023

(30) Foreign Application Priority Data

Aug. 27, 2020 (JP) ................................ 2020-143245

(51) Int. Cl.
*B41M 5/333* (2006.01)
*B41M 5/323* (2006.01)
*B41M 5/327* (2006.01)

(52) U.S. Cl.
CPC ........... *B41M 5/3333* (2013.01); *B41M 5/323* (2013.01); *B41M 5/3275* (2013.01); *B41M 2205/04* (2013.01)

(58) Field of Classification Search
CPC ......................... B41M 5/3333; B41M 5/3335; B41M 5/3336; B41M 2205/04
See application file for complete search history.

(56) References Cited

U.S. PATENT DOCUMENTS 3,539,375 A 11/1970 Baum
5,801,288 A 9/1998 Fujii et al.
2001/0044553 A1 11/2001 Kabashima et al.
2011/0044553 A1 2/2011 Coupe et al.
2018/0345710 A1 12/2018 Miyanaga et al.
2023/0202220 A1* 6/2023 Stalling ................ C07C 309/76 429/221

FOREIGN PATENT DOCUMENTS

EP 4349609 A1 * 4/2024 ............. B41M 5/28
JP 57-11088 A 1/1982
JP 8-333329 A 12/1996
JP 2000-143611 A 5/2000
JP 2019-136983 A 8/2019
JP 2020-40287 A 3/2020
WO 2017/111032 A1 6/2017
WO WO-2021223939 A1 * 11/2021 .......... B41M 5/3275
WO WO-2022255256 A1 * 12/2022 ............. B41M 5/28

OTHER PUBLICATIONS

International Search Report mailed Nov. 16, 2021 in corresponding PCT application No. PCT/JP2021/031491.
International Preliminary Report on Patentability issued Feb. 14, 2022 in corresponding PCT application No. PCT/JP2021/031491.
Benmansour et al., Discovery of novel dengue virus NS5 methyltransferase non-nucleoside inhibitors by fragment-based drug design. Eur J Med Chem. Jan. 5, 2017;125:865-880.

* cited by examiner

*Primary Examiner* — Gerard Higgins
(74) *Attorney, Agent, or Firm* — Nields, Lemack & Frame, LLC

(57) ABSTRACT

A thermosensitive recording material including a compound represented by the following formula (1):

(1)

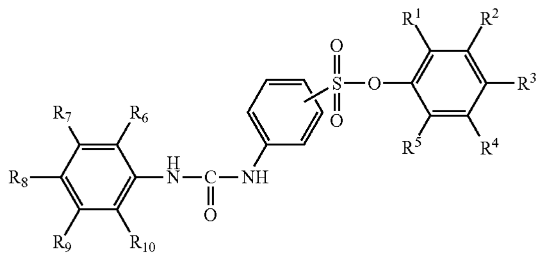

wherein, $R^1$ to $R^{10}$ each independently represent a hydrogen atom, a halogen atom, a nitro group, an amino group, an alkyl group, an alkoxy group, an aryl oxy group, an alkyl carbonyl oxy group, an aryl carbonyl oxy group, an alkyl carbonyl amino group, an aryl carbonyl amino group, an alkyl sulfonyl amino group, an aryl sulfonyl amino group, a monoalkyl amino group, a dialkyl amino group, or an aryl amino group.

12 Claims, No Drawings

THERMOSENSITIVE RECORDING MATERIAL

TECHNICAL FIELD

The present invention relates to a thermosensitive recording material utilizing coloring by a reaction between a color forming dye and a color developing agent.

BACKGROUND ART

In general, a thermosensitive recording material is obtained by separately dispersing a leuco dye and a color developing agent such as a phenolic compound in a form of fine particles, then mixing the dispersed leuco dye and the dispersed color developing agent, and adding an additive such as a binder, a sensitizer, a filler, or a lubricant to the mixture to obtain a coating liquid; and then applying the coaling liquid to paper, a film, synthetic paper, or the like. The thermosensitive recording material produces a color through a chemical reaction that occurs by melting one or both of the leuco dye and the color developing agent by heating to bring the leuco dye and the color developing agent into contact with each other. To induce the color formation of such a thermosensitive recording material, a thermal printer equipped with a thermal head or the like is used. Compared to other recording methods, this thermosensitive recording method has such characteristics that (1) no noise is generated at the time of recording, (2) there is no requirement for developing or fixing an image; (3) free from maintenance, and (4) a machine is relatively inexpensiveness; and has been therefore widely used in the fields of a facsimile, output of a computer, a printer of a calculator or the like, a recorder of a medical instrument, an automatic ticket vending machine, a thermosensitive recording label; and the like.

In recent years, as applications of a thermosensitive recording material has expanded, a need for high-speed recording has been increasing. Specifically, there is a strong need for development of a thermosensitive recording material having excellent thermal responsiveness and sufficiently adaptable to high-speed recording. In order to satisfy such a need, research and development of a color forming dye, a color developing agent, a stabilizer, and the like have been performed, but those that sufficiently balance color sensitivity, image stability, and the like have not been found yet.

In general, a color developing compound having a phenolic hydroxy group has high color developing capability. Among such compounds, many reports for bisphenol-based compounds have been made due to high intensity thereof, and 2,2-bis(4-hydroxyphenyl propane) (bisphenol A) (Patent Literature 1), 4,4'-dihydroxydiphenylsulfone (bisphenol S) (Patent Literature 2), and the like have been proposed. However, these compounds have high melting points, and therefore are inferior in thermal responsiveness, and also have disadvantages that printed portions are inferior in water resistance and a background is inferior in heat resistance.

In this regard, disclosed is a thermosensitive recording material containing a specific color developing compound which provides printed portions having excellent water resistance and a background exhibiting high stability to heat (Patent Literature 3), but that material is insufficient in terms of plasticizer resistance of the printed portions. A cross-linked diphenylsulfone compound (Patent Literature 4) and a urea urethane compound (Patent Literature 5) have been proposed as color developing compounds providing high stability to a plasticizer, but they have a problem of low thermal responsiveness.

On the other hand, disclosed is a thermosensitive recording material containing a specific color developing compound and a urea urethane compound in combination which provides printed portions with improved stability. However, the combined urea urethane compound causes significant background fogging when the thermosensitive recording material is stored in a high humidity environment. Therefore, there is a need for a thermosensitive recording material which not only achieves high thermal responsiveness but also provide printed portions and a background with good stability.

CITATION LIST

Patent Literature

PATENT LITERATURE 1: U.S. Pat. No. 3,539,375 B
PATENT LITERATURE 2: JP-A-57-11088
PATENT LITERATURE 3: WO-A-2017/111032.
PATENT LITERATURE 4: JP-A-08-333329
PATENT LITERATURE 5: JP-A-2000-143611

Non-Patent Literature

NON-PATENT LITERATURE 1: European Journal of Medicinal Chemist (2017), 125, 865-880

SUMMARY OF INVENTION

Technical Problem

An object of the present invention is to provide a recording material and a recording sheet containing, as a color developing agent, a non-phenolic compound wherein a printed portion exhibits excellent water resistance and a background portion exhibits favorable heat resistance as compared with the prior art.

Solution to Problem

As a result of intensive studies to achieve the above object, the present inventor has newly found that a thermosensitive recording material containing a compound represented by the following general formula (1) as a color developing compound provides printed portions having excellent water resistance and a background portion having excellent heat resistance and thus completed the present invention.

That is, the present invention relates to:

[1] a thermosensitive recording material comprising at least one compound represented by general formula (1):

(1)

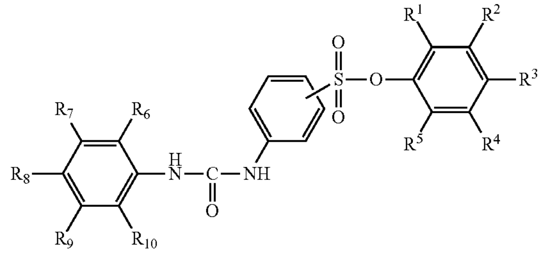

wherein, $R^1$ to $R^{10}$ each independently represent a hydrogen atom, a halogen atom, a nitro group, an amino group, an alkyl group, a hydroxy group, an alkoxy group, an aryl oxy group, an alkyl carbonyl oxy group, an amyl carbonyl oxy group, an alkyl carbonyl amino group, an aryl carbonyl amino group, an alkyl sulfonyl amino group, an aryl sulfonyl amino group, a monoalkyl amino group, a diallyl amino group, or an aryl amino group;

[2] the thermosensitive recording material according to [1] wherein the compound represented by general formula (1) is a compound represented by formula (2):

(2)

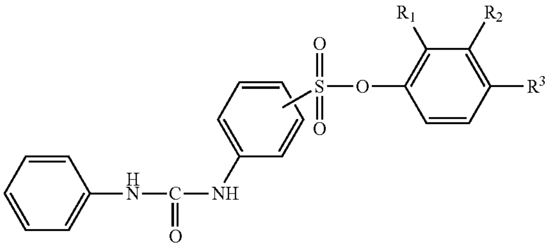

wherein, $R^1$ to $R^3$ are the same s as defined above;

[3] the thermosensitive recording material according to [1] or [2], wherein $R^1$ to $R^3$ each independently represent a hydrogen atom or a methyl group in general formula (1);

[4] a thermosensitive recording layer comprising the thermosensitive recording material according to any one of [1] to [3]; and

[5] a thermosensitive recording paper comprising the thermosensitive recording layer according to [4].

Advantageous Effects of Invention

The present invention provides a thermosensitive recording material which provides printed portions with excellent coloring property and water resistance, and a background with excellent heat resistance.

DESCRIPTION OF EMBODIMENTS

The present invention will be described in detail with reference to embodiments thereof but is not limited by the embodiments described below. The present invention relates to a thermosensitive recording material containing a compound represented by general formula (1) as a color developing compound, and a thermosensitive recording layer and a thermosensitive recording paper containing the thermosensitive recording material.

In an embodiment of the present invention, examples of the halogen atom in $R^1$ to $R^{10}$ of general formula (1) include a fluorine atom, a chlorine atom, and a bromine atom; and a fluorine atom or a chlorine atom is preferable.

In an embodiment of the present invention, examples of the alkyl group in $R^1$ to $R^{10}$ of general formula (1) include a linear, branched or cyclic alkyl group, and among them a linear or branched alkyl group is preferable, and a linear alkyl group is more preferable. The number of carbon atoms is usually in the range of C1 to C12, preferably C1 to C8, more preferably C1 to C6, and still more preferably C1 to C4. Specific examples thereof include: a linear alkyl group such as methyl, ethyl, n-propyl, n-butyl, n-pentyl, n-hexyl, n-octyl, n-nonyl, n-decyl, n-undecyl, and n-dodecyl; a branched alkyl group such as isopropyl, isobutyl, sec-butyl, t-butyl, isopentyl, isohexyl, and isooctyl; and a cyclic alkyl group such as cyclopropyl, cyclobutyl, cyclopentyl, and cyclohexyl.

In an embodiment of the present invention, examples of the alkoxy group in $R^1$ to $R^{10}$ of general formula (1) include a linear; branched or cyclic alkoxy group, and among them a linear or branched alkoxy group is preferable, and a linear alkoxy group is more preferable. The number of carbon atoms is usually in the range of C1 to C12, preferably C1 to C8, more preferably C1 to C6, and still more preferably C1 to C4. Specific examples thereof include: a linear alkoxy group such as methoxy, ethoxy, n-propoxy, n-butoxy, n-pentoxy, n-hexyloxy, n-heptoxy, n-octyloxy, n-nonyloxy, and n-decyloxy; a branched (preferably C3 to C10) alkoxy group such as isopropoxy, isobutoxy, sec-butoxy, t-butoxy, isoamyloxy, t-amyloxy, isohexyloxy, t-hexyloxy, isoheptoxy, t-heptoxy, isooctyloxy, t-octyloxy, 2-ethylhexyloxy, isononyloxy, and isodecyloxy; and a cyclic (preferably C3 to C7) alkoxy group such as cyclopropoxy, cyclobutoxy, cyclopentoxy, cyclohexyloxy, or cyclohexoxy.

In an embodiment of the present invention, the aryl oxy group in $R^1$ to $R^{10}$ of general formula (1) is preferably a C6 to C12 aryl oxy group, and specific examples thereof include phenoxy, naphthyloxy, and biphenyloxy.

In an embodiment of the present invention, examples of the alkyl carbonyloxy group in $R^1$ to $R^{10}$ of general formula (1) include a linear, branched or cyclic alkyl carbonyl oxy group. Among them, a C1 to C10 alkyl carbonyl oxy group is preferable. Specific examples thereof include: a linear alkyl carbonyl oxy group such as methyl carbonyl oxy, ethyl carbonyl oxy, n-propyl carbonyl oxy, n-butyl carbonyl oxy, n-pentyl carbonyl oxy, n-hexyl carbonyl oxy, n-heptyl carbonyl oxy, n-octyl carbonyl oxy, n-nonyl carbonyl oxy, and n-decyl carbonyl oxy; a branched (preferably C3 to C10) carbonyl oxy group such as isopropyl carbonyl oxy, isobutyl carbonyl oxy, sec-butyl carbonyl oxy, t-butyl carbonyl oxy, isoamyl carbonyl oxy, t-amyl carbonyl oxy, isohexyl carbonyl oxy, t-hexyl carbonyl oxy, isoheptyl carbonyl oxy, t-heptyl carbonyl oxy, isooctyl carbonyl oxy, t-octyl carbonyl oxy, 2-ethylhexyl carbonyl oxy, isononyl carbonyl oxy, and isodecyl carbonyl oxy; and a cyclic (preferably C3 to C7) alkyl carbonyl oxy group such as cyclopropyl carbonyl oxy, cyclobutyl carbonyl oxy, cyclopentyl carbonyl oxy, cyclohexyl carbonyl oxy, and cycloheptyl carbonyl oxy. Among them a linear or branched alkyl carbonyl oxy group is preferable, and a linear alkyl carbonyl oxy group is more preferable.

In an embodiment of the present invention, the aryl carbonyl oxy group in $R^1$ to $R^{10}$ of general formula (1) is preferably a C6 to C12 aryl carbonyl oxy group, and specific examples thereof include phenyl carbonyl oxy, naphthyl carbonyl oxy, and biphenyl carbonyl oxy.

In an embodiment of the present invention, examples of the alkyl carbonyl amino group in $R^1$ to $R^{10}$ of general formula (1) include a linear, branched or cyclic alkyl carbonyl amino group. Among them, a C1 to C10 alkyl carbonyl amino group is preferable. Specific examples thereof include: a linear alkyl carbonyl amino group such as methyl carbonyl amino, ethyl carbonyl amino, n-propyl carbonyl amino, n-butyl carbonyl amino, n-pentyl carbonyl amino, n-hexyl carbonyl amino, n-heptyl carbonyl amino, n-octyl carbonyl amino, n-nonyl carbonyl amino, and n-decyl carbonyl amino; a branched (preferably C3 to C10) carbonyl amino group such as isopropyl carbonyl amino, isobutyl carbonyl amino, sec-butyl carbonyl amino, t-butyl carbonyl amino, isoamyl carbonyl amino, t-amyl carbonyl amino, isohexyl carbonyl amino, t-hexyl carbonyl amino, isoheptyl carbonyl amino, t-heptyl carbonyl amino, isooctyl carbonyl amino, t-octyl carbonyl amino, 2-ethylhexyl carbonyl amino, isononyl carbonyl amino, and isodecyl carbonyl amino; and a cyclic (preferably C3 to C7) alkyl carbonyl amino group such as cyclopropyl carbonyl amino, cyclobutyl carbonyl amino, cyclopentyl carbonyl amino, cyclohexyl carbonyl amino, and cycloheptyl carbonyl amino. Among them, a linear or branched alkyl carbonyl amino group is preferable, and a linear alkyl carbonyl amino group is more preferable.

In an embodiment of the present invention, the aryl carbonyl amino group in $R^1$ to $R^{10}$ of general formula (1) is preferably a C6 to C12 aryl carbonyl amino group. Specific examples thereof include phenyl carbonyl amino, naphthyl carbonyl amino, and biphenyl carbonyl amino.

In an embodiment of the present invention, examples of the alkyl sulfonyl amino group in $R^1$ to $R^{10}$ of general formula (1) include a linear, branched or cyclic alkyl sulfonyl amino group. Among them, a C1 to C10 alkyl sulfonyl amino group is preferable. Specific examples thereof include: a linear alkyl sulfonyl amino group such as methyl sulfonyl amino, ethyl sulfonyl amino, n-propyl sulfonyl amino, n-butyl sulfonyl amino, n-pentyl sulfonyl amino, n-hexyl sulfonyl amino, n-heptyl sulfonyl amino, n-octyl sulfonyl amino, n-nonyl sulfonyl amino, and n-decyl sulfonyl amino; a branched (preferably C3 to C10) sulfonyl amino group such as isopropyl sulfonyl amino, isobutyl sulfonyl amino, sec-butyl sulfonyl amino, t-butyl sulfonyl amino, isoamyl sulfonyl amino, t-amyl sulfonyl amino, isohexyl sulfonyl amino, t-hexyl sulfonyl amino, isoheptyl sulfonyl amino, t-heptyl sulfonyl amino, isooctyl sulfonyl amino, t-octyl sulfonyl amino, 2-ethylhexyl sulfonyl amino, isononyl sulfonyl amino, and isodecyl sulfonyl amino; and a cyclic (preferably C3 to C7) alkyl sulfonyl amino group such as cyclopropyl sulfonyl amino, cyclobutyl sulfonyl amino, cyclopentyl sulfonyl amino, cyclohexyl sulfonyl amino, and cycloheptyl sulfonyl amino. Among them, a linear or branched alkyl sulfonyl amino group is preferable, and a linear alkyl sulfonyl amino group is more preferable.

In an embodiment of the present invention, the aryl sulfonyl amino group in $R^1$ to $R^{10}$ of general formula (1) is preferably a C6 to C12 aryl sulfonyl amino group. Specific examples thereof include phenyl sulfonyl amino, toluene sulfonyl amino, naphthyl sulfonyl amino, and biphenyl sulfonyl amino.

In an embodiment of the present invention, examples of the monoalkyl amino group in $R^1$ to $R^{10}$ of formula (1) include a linear, branched or cyclic monoalkyl amino group. Among them, a mono C1 to C10 alkyl amino group is preferable. Specific examples thereof include: a linear monoalkyl amino group such as methyl amino, ethyl amino, n-propyl amino, n-butyl amino, n-pentyl amino, n-hexyl amino, n-heptyl amino, n-octyl amino, n-nonyl amino, and n-decyl amino; a branched (preferably C3 to C10) monoalkyl amino group such as isopropyl amino, isobutyl amino, sec-butyl amino, t-butyl amino, isoamyl amino, t-amyl amino, isohexyl amino, t-hexyl amino, isoheptyl amino, t-heptyl amino, isooctyl amino, t-octyl amino, 2-ethylhexyl amino, isononyl amino, and isodecyl amino; and a cyclic (preferably C3 to C7) monoalkyl amino group such as cyclopropyl amino, cyclobutyl amino, cyclopentyl amino, cyclohexyl amino, or cycloheptyl amino. Among them, a linear or branched monoalkyl amino group is preferable, and a linear monoalkyl amino group is more preferable.

In an embodiment of the present invention, examples of the dialkyl amino group in $R^1$ to $R^{10}$ of general formula (1) include a linear, branched or cyclic dialkyl amino group. Among them, a di C1 to C10 alkyl amino group is preferable. Specific examples thereof include: a linear dialkyl amino group such as dimethyl amino, diethyl amino, di-n-propyl amino, di-n-butyl amino, di-n-pentyl amino, di-n-hexyl amino, di-n-heptyl amino, di-n-octyl amino, di-n-nonyl amino, and di-n-decyl amino; a branched dialkyl amino group (preferably having two C3 to C10 branched chains) such as diisopropyl amino, diisobutyl amino, di-sec-butyl amino, di-t-butyl amino, diisoarnyl amino, di-t-amyl amino, diisohexyl amino, di-t-hexyl amino, diisoheptyl amino, di-t-heptyl amino, diisooctyl amino, di-t-octyl amino, di-(2-ethylhexyl) amino, diisononyl amino, and diisodecyl amino; and a cyclic dialkyl amino group (preferably having two C3 to C7 cyclic groups) such as dicyclopropyl amino, dicyclobutyl amino, dicyclopentyl amino, dicyclohexyl amino, and dicycloheptyl amino. Among them, a linear or branched dialkyl amino group is preferable, and a linear dialkyl amino group is more preferable.

In an embodiment of the present invention, examples of the aryl amino group in $R^1$ to $R^{10}$ of general formula (1) include a monoaryl amino group and a diaryl amino group. Among them, a mono C6 to C12 aryl amino group is preferable. Specific examples thereof include phenylamino (anilino), naphthylamino, and biphenylamino. Examples of the aryl amino group also include a di C6 to C12 aryl amino group. Specific examples thereof include diphenylamino, dinaphthylamino, and di(biphenyl) amino.

In an embodiment of the present invention, the compound represented by general formula (1) is preferably a compound represented by general formula (2).

$R^1$ to $R^3$ in the general formula (2) each preferably represent an alkyl group or a hydrogen atom, more preferably represent a linear C1 to C4 alkyl group or a hydrogen atom, and particularly preferably represent a methyl group or a hydrogen atom.

In general formula (1), the substitution position of a substituent represented by general formula (3) may be an ortho position, a meta position, and a para position, and a para position or a meta position is preferable.

(3)

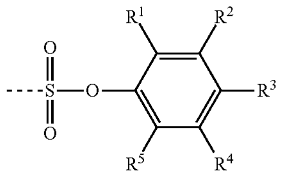

Exemplary compounds of the present invention are set forth in Table 1 below, although being not limited thereto.

TABLE 1-1
| Compound No. | Structural formula |
| --- | --- |
| 1 | 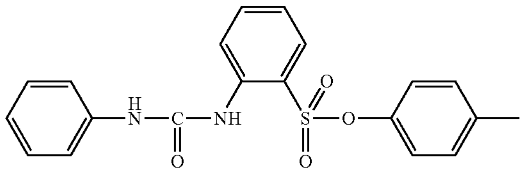 [SMILES: Cc1ccc(OS(=O)(=O)c2ccccc2NC(=O)Nc2ccccc2)cc1] |
| 2 | 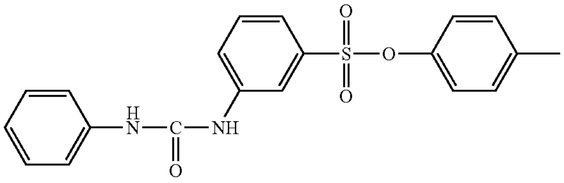 [SMILES: Cc1ccc(OS(=O)(=O)c2cccc(NC(=O)Nc3ccccc3)c2)cc1] |
| 3 | 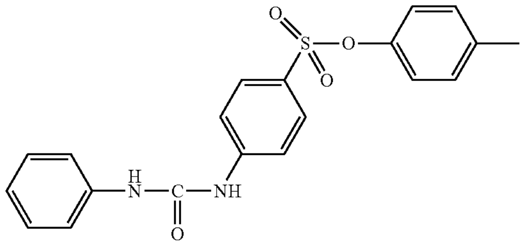 [SMILES: Cc1ccc(OS(=O)(=O)c2ccc(NC(=O)Nc3ccccc3)cc2)cc1] |
| 4 | 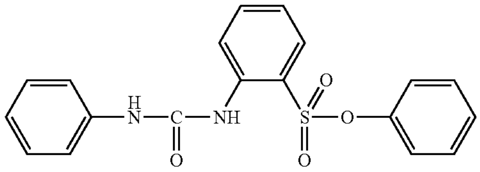 [SMILES: O=C(Nc1ccccc1)Nc1ccccc1S(=O)(=O)Oc1ccccc1] |
| 5 | 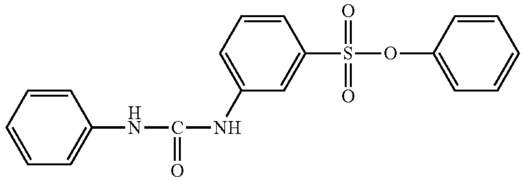 [SMILES: O=C(Nc1ccccc1)Nc1cccc(S(=O)(=O)Oc2ccccc2)c1] |
| 6 | 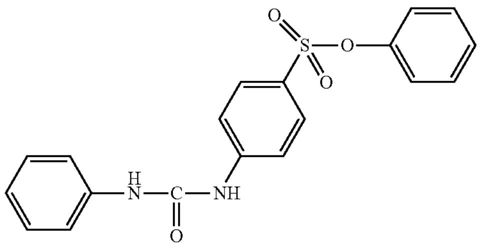 [SMILES: O=C(Nc1ccccc1)Nc1ccc(S(=O)(=O)Oc2ccccc2)cc1] |
| 7 | 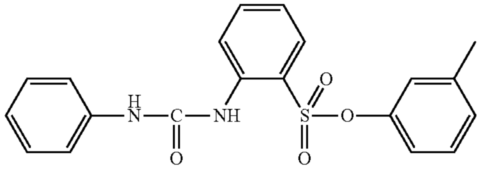 [SMILES: Cc1cccc(OS(=O)(=O)c2ccccc2NC(=O)Nc2ccccc2)c1] |

TABLE 1-1-continued
| Compound No. | Structural formula |
| --- | --- |
| 8 | 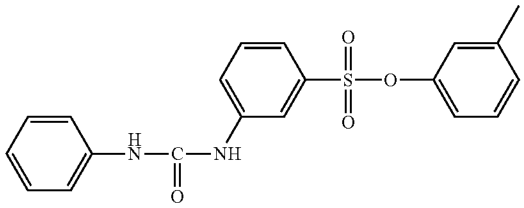 [SMILES: Cc1cccc(OS(=O)(=O)c2cccc(NC(=O)Nc3ccccc3)c2)c1] |
| 9 | 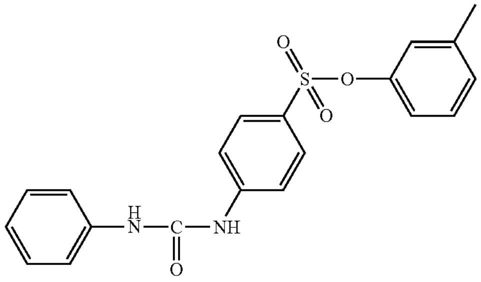 [SMILES: Cc1cccc(OS(=O)(=O)c2ccc(NC(=O)Nc3ccccc3)cc2)c1] |
| 10 | 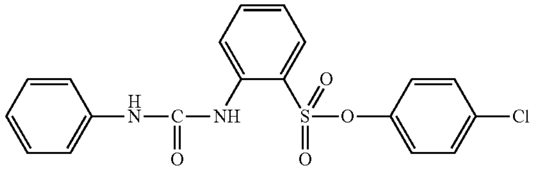 [SMILES: O=C(Nc1ccccc1)Nc1ccccc1S(=O)(=O)Oc1ccc(Cl)cc1] |
| 11 | 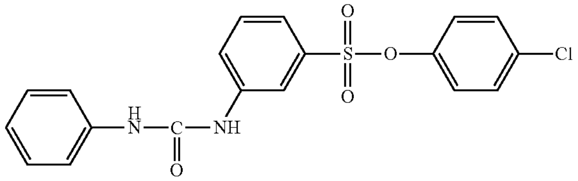 [SMILES: O=C(Nc1ccccc1)Nc1cccc(S(=O)(=O)Oc2ccc(Cl)cc2)c1] |
| 12 | 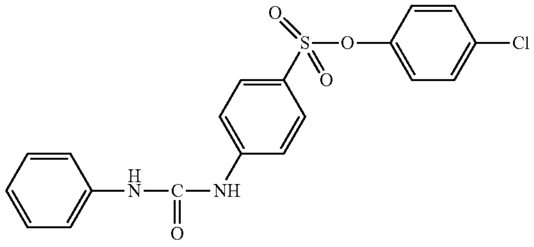 [SMILES: O=C(Nc1ccccc1)Nc1ccc(S(=O)(=O)Oc2ccc(Cl)cc2)cc1] |
| 13 | 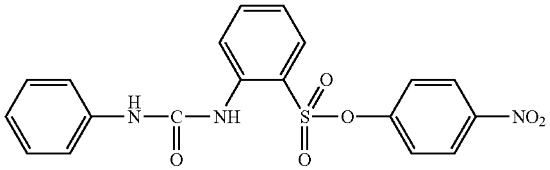 [SMILES: O=C(Nc1ccccc1)Nc1ccccc1S(=O)(=O)Oc1ccc([N+](=O)[O-])cc1] |
| 14 | 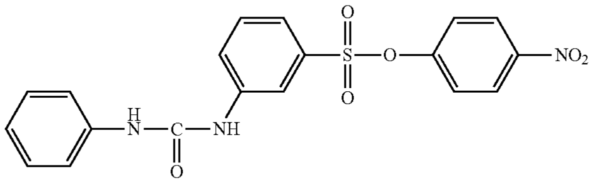 [SMILES: O=C(Nc1ccccc1)Nc1cccc(S(=O)(=O)Oc2ccc([N+](=O)[O-])cc2)c1] |

TABLE 1-1-continued

| Compound No. | Structural formula |
| --- | --- |
| 15 | 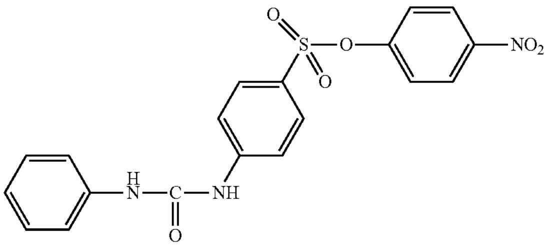 [SMILES: O=C(Nc1ccccc1)Nc1ccc(S(=O)(=O)Oc2ccc([N+](=O)[O-])cc2)cc1] |

The compounds of general formula (1) can be obtained, for example, bar a known synthesis method as described in European Journal of Medicinal Chemistry (2017), 125, 865-880 (Non-Patent Literature 1).

[Manufacturing Process]

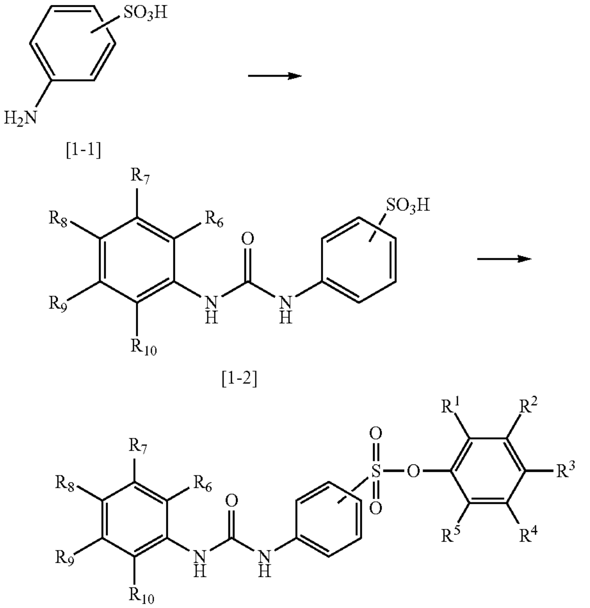

[1-1]

[1-2]

[1-3]

wherein, $R^1$ to $R^{10}$ are the same as defined above.

The compounds of general formula [1-2] can be manufactured by causing the compound of general formula [1-1] to react with a phenyl isocyanate compound in the presence or absence of a base. A solvent used in this reaction is not particularly limited as long as the solvent does not affect the reaction, and examples thereof include: an amide compound such as N,N-dimethylformamide, N,N-dimethylacetamide, or N-methylpynolidone; a halogenated hydrocarbon compound such as methylene chloride or chloroform; an aromatic hydrocarbon compound such as benzene, toluene, or xylene; an ether compound such as dioxane, tetrahydrofuran, anisole, ethylene glycol dimethyl ether, diethylene glycol dimethyl ether, tetrahydrofuran, or diethylene glycol diethyl ether; a nitrile compound such as acetonitrile; a ketone compound such as acetone or 2-butanone; an ester compound such as ethyl acetate or butyl acetate; a sulfone compound such as sulfolane; a sulfoxide compound such as dimethyl sulfoxide; and water. These may be used in combination.

The amount of a phenyl isocyanate compound used in this reaction is usually 0.1 to 50 fold mol, and preferably 0.5 to 3 fold mol with respect to that of the compound of general formula [1-1].

Examples of the base optionally used in this reaction include: an inorganic base such as sodium hydroxide, potassium hydroxide, sodium hydrogen carbonate, sodium carbonate, potassium hydrogen carbonate, potassium carbonate, and cesium carbonate; and an organic base such as triethylamine, and diisopropylethylamine. The amount of a base used in the reaction is usually 0.1 to 50 fold mol, and preferably 0.5 to 5 fold mol with respect to that of the compound of general formula [1-1].

A reaction temperature of this reaction is usually −78 to 120° C., and preferably −10 to 80° C. The reaction may be performed for 10 minutes to 24 hours.

The compounds of general formula [1-3] can be manufactured by causing a compound of general formula [1-2] to react with phosphorus oxychloride, thionyl chloride, chlorosulfonic acid, oxalyl chloride, or the like in the presence or absence of a base to form a chloride sulfonate, and subsequently the chloride sulfonate is caused to react with a phenol compound, or caused to react with a phenol compound through direct dehydration condensation.

A solvent used in this reaction is not particularly limited as long as the solvent does not affect the reaction, and examples thereof include: an amide compound such as N,N-dimethylformamide, N,N-dimethylacetamide, or N-methylpyrrolidone; a halogenated hydrocarbon compound such as methylene chloride or chloroform; an aromatic hydrocarbon compound such as benzene, toluene, or xylene; an ether compound such as dioxane, tetrahydrofuran, anisole, ethylene glycol dimethyl ether, diethylene glycol dimethyl ether, tetrahydrofuran, or diethylene glycol diethyl ether; a nitrile compound such as acetonitrile; a ketone compound such as acetone or 2-butanone; an ester compound such as ethyl acetate or butyl acetate; a sulfone compound such as sulfolane; a sulfoxide compound such as dimethyl sulfoxide; and water. These may be used in combination.

The amount of the phenol compound used in this reaction is 0.1 to 50 fold mol, and preferably 0.7 to 3 fold mol with respect to that of the compound of general formula [1-2]. A reaction temperature is usually −78 to 100° C., and preferably −20 to 80° C. The reaction may be performed for 10 minutes to 24 hours.

In forming a thermosensitive recording material, a color-forming compound is usually used in an amount of 1 to 50% by mass, preferably 5 to 30% by mass; and a compound represented by general formula (1) is usually used in an amount of 1 to 70% by mass, and preferably 10 to 50% by mass. A sensitizer is usually used in an amount of 1 to 80% by mass; a stabilizer is usually used in an amount of 0 to 30% by mass; a binder is usually used in an amount of 1 to 90% by mass; a filler is usually used in an amount of 0 to 80% by mass; and each of other components such as a lubricant, a surfactant, a defoamer, and an ultraviolet absorber may be used at any ratio and is usually used, for example, in an amount of 0 to 30% by mass. Here, % by mass indicates a mass ratio of each component in a thermosensitive recording layer.

According to a more preferable embodiment, for the above-described compositions, a compound represented by formula (1) is usually used in a mass ratio range of 0.5 to 20 times, more preferably in a mass ratio range of 1 to 5 times with respect to a color-forming compound. A thermosensitive recording material of the present invention may comprise another color developing compound, a sensitizer, or other additives known in the art other than the above components.

The color-forming compound is not particularly limited and may be a compound ordinarily used for a pressure-sensitive recording paper or a thermosensitive recording paper. Examples of the color-forming compound include a fluoran-based compound, a triarylmethane-based compound, a spiro-based compound, a di phenyl methane-based compound, a thiazine-based compound, a lactam-based compound, and a fluorene-based compound; and a fluoran-based compound is preferable.

Specific examples of the fluoran-based compound include 3-diethylamino-6-methyl-7-anilinofluoran, 3-dibutylamino-6-methyl-7-anilinofluoran, 3-(N-methyl-N-cyclohexylamino)-6-methyl-7-anilinofluoran, 3-(N-ethyl-N-isopentylamino)-6-methyl-7-anilinofluoran, 3-(N-ethyl-N-isobutylamino)-6-methyl-7-anilinofluoran, 3-[N-ethyl-N-(3-ethoxypropyl) amino]-6-methyl-7-anilinofluoran, 3-(N-ethyl-N-hexylamino)-6-methyl-7-anilinofluoran, 3-dipentylamino-6-methyl-7-anilinofluoran, 3-(N-methyl-N-propylamino)-6-methyl-7-anilinofluoran, 3-(N-ethyl-N-tetrahydrofurylamino)-6-methyl-7-anilinofluoran, 3-diethylamino-6-methyl-7-(p-chloroanilino) fluoran, 3-diethylamino-6-methyl-7-(p-fluoroanilino) fluoran, 3-[N-ethyl-N-(p-tolyl)amino]-6-methyl-7-anilinofluoran, 3-diethylamine-6-methyl-7-(p-toluidino) fluoran, 3-diethylamino-7-(o-chloroanilino) fluoran, 3-dibutylamino-7-(o-chloroanilino) fluoran, 3-diethylamino-7-(o-fluoroanilino)) fluoran, 3-dibutylamino-7-(o-fluoroanilino) fluoran, 3-diethylamino-7-(3,4-dichloroanilino) fluoran, 3-pyrrolidino-6-methyl-7-anilinofluoran, 3-diethylamino-6-chloro-7-ethoxyethylaminofluoran, 3-diethylamino-6-chloro-7-anilinofluoran, 3-diethylamino-7-chlorofluoran, 3-diethylamino-7-methylfluoran, 3-diethylamino-7-octylfluoran, and 3-[N-ethyl-N-(p-tolyl) amino]-6-methyl-7-phenethylfluoran; and 3-dibutylamino-6-methyl-7-anilinofluoran is preferable.

Specific examples of the triarylmethane-based compound include 3,3-bis(p-dimethylaminophenyl)-6-dimethylaminophthalide (another name: crystal violet lactone or CVL), 3,3-bis(p-dimethylaminophenyl) phthalide, 3-(p-dimethylaminophenyl)-3-(1,2-dimethylaminoindol-3-yl) phthalide, 3-(p-dimethylaminophenyl)-3-(2-methylindol-3-yl) phthalide, 3-(p-dimethylaminophenyl)-3-(2-phenylindol-3-yl) phthalide, 3,3-bis(1,2-dimethylindol-3-yl)-5-dimethylaminophthalide, 3,3-bis(1,2-dimethylindol-3-yl)-6-dimethylaminophthalide, 3,3-bis(9-ethylcarbazol-3-yl)-5-dimethylaminophthalide, 3,3-(2-phenylindol-3-yl)-5-dimethylaminophthalide, and 3-p-dimethylaminophenyl-3-(1-methylpyrrol-2-yl)-6-dimethylaminophthalide.

Specific examples of the spiro-based compound include 3-methylspirodinaphthopyran, 3-ethylspirodinaphthopyran, 3,3'-dichlorospirodinaphthopyran, 3-benzylspirodinaphthopyran, 3-propylspirobenzopyran, 3-methylnaphtho-(3-methoxybenzo) spiropyran, and 1,3,3-trimethyl-6-nitro-8'-methoxyspiro (indoline-2,2'-benzopyran). Specific examples of the diphenylmethane-based compound include N-halophenyl-leucoauramine, 4,4-bis-dimethylaminophenylbenzhydryl benzyl ether, and N-2,4,5-trichlorophenyl leucoauramine. Specific examples of the thiazine-based compound include benzoyl leucomethylene blue and p-nitrobenzoyl leucomethylene blue. Specific examples of the lactam-based compound include rhodamine B anilinolactam and rhodamine B-p-chloroanilinolactam. Specific examples of the fluorene-based compound include 3,6-bis(dimethylamino) fluorene spiro (9,3')-6'-dimethylaminophthalide, 3,6-bis(dimethylamino) fluorene spiro (9,3')-6'-pyrrolidinophthalide, and 3-dimethylamino-6-diethylaminofluorene spiro (9,3')-6'-pyrrolidinophthalide.

These color-forming compounds are used singly or in combination thereof.

Another color developing compound that can be used in combination with those of the present invention are not particularly limited and may be a compound ordinarily used for a pressure-sensitive recording paper or a thermosensitive recording paper, and examples thereof include: a phenolic compound such as α-naphthol, β-naphthol, p-octylphenol, 4-t-octylphenol, p-t-butylphenol, p-phenylphenol, 1,1-bis(p-hydroxyphenyl) propane, 2,2-bis(p-hydroxyphenyl) propane (also referred to as bisphenol A or BPA), 2,2-bis(p-hydroxyphenyl) butane, 1,1-bis(p-hydroxyphenyl) cyclohexane, 4,4'-thiobisphenol, 4,4'-cyclo-hexylidenediphenol, 2,2'-bis(2,5-dibrom-4-hydroxyphenyl) propane, 4,4'-isopropylidenebis(2-t-butylphenol), 2,2'-methylenebis(4-chlorophenol), 4,4'-dihydroxydiphenylsulfone, 4-hydroxy-4'-methoxydiphenylsulfone, 2,4'-dihydroxydiphenylsulfone, 4-hydroxy-4'-isopropoxydiphenylsulfone, 4-hydroxy-4'-ethoxy diphenylsulfone, 4-hydroxy-4'-butoxydiphenylsulfone, 4-hydroxy-4'-benzyloxydiphenylsulfone, bis(4-hydroxyphenyl) methyl acetate, bis(4-hydroxyphenyl) butyl acetate, bis(4-hydroxyphenyl) benzyl acetate, and 2,4-dihydroxy-2'-methoxybenzanilide; an aromatic carboxylic acid derivative such as benzyl p-hydroxybenzoate, ethyl p-hydroxybenzoate, dibenzyl 4-hydroxyphthalate, dimethyl 4-hydroxyphthalate, ethyl 5-hydroxyisophthalate, 3,5-di-t-butylsalicylic acid, and 3,5-di-α-methylbenzylsalicylic acid; an aromatic carboxylic acid; and a polyvalent metal salt thereof.

Specific examples of the sensitizer (thermal fusible compound) include a wax such as an animal or vegetable wax or a synthetic wax, a higher fatty acid, a higher fatty acid amide, a higher fatty acid anilide, a naphthalene derivative, an aromatic ether, an aromatic carboxylic acid derivative, an aromatic sulfonic acid ester derivative, a carbonic acid or oxalic acid diester derivative, a biphenyl derivative, a terphenyl derivative, a sulfone derivative, an aromatic ketone derivative, and an aromatic hydrocarbon compound.

Specific examples of the wax include a vegetable wax, a camauba wax, shellac, paraffin, a montan wax, oxidized paraffin, a polyethylene wax, and oxidized polyethylene. Examples of the higher fatty acid include stearic acid and behenic acid. Examples of the higher fatty acid amide include stearic acid amide, oleic acid amide, N-methyl stearic acid amide, erucic acid amide, methylol behenic acid amide, methylene bis stearic acid amide, and ethylene bis stearic acid amide. Examples of the higher fatty acid anilide include stearic acid anilide and linoleic acid anilide. Examples of the naphthalene derivative include 1-benzyloxynaphthalene, 2-benzyloxynaphthalene, phenyl 1-hydroxy naphthoate, and 2,6-diisopropylnaphthalene. Examples of the aromatic ether include 1,2-diphenoxyethane, 1,4-diphenoxybutane, 1,2-bis(3-methylphenoxy) ethane, 1,2-bis(4-methoxyphenoxy) ethane, 1,2-bis(3,4-dimethylphenyl) ethane, 1-phenoxy-2-(4-chlorophenoxy) ethane, 1-phenoxy-2-(4-methoxyphenoxy) ethane, 1,2-diphenoxymethylbenzene, and diphenyl glycol. Examples of the aromatic carboxylic acid derivative include benzyl p-hydroxybenzoate, benzyl p-benzyloxybenzoate, and dibenzyl terephthalate. Examples of the aromatic sulfonic acid ester derivative include phenyl p-toluenesulfonate, phenyl mesitylenesulfonate, 4-methylphenyl mesitylenesulfonate, and 4-tolyl mesitylenesulfonate. Examples of the carbonic acid or oxalic acid diester derivative include diphenyl carbonate, dibenzyl oxalate, di(4-chlorobenzyl) oxalate, and di(4-methylbenzyl) oxalate. Examples of the biphenyl derivative include p-benzylbiphenyl and p-allyloxybiphenyl. Examples of the terphenyl derivative include m-terphenyl. Examples of the sulfone derivative include p-toluene sulfonamide, benzene sulfonanilide, p-toluene sulfonanilide, 4,4'-diallyloxy diphenyl sulfone, and diphenyl sulfone. Examples of the aromatic ketone derivative include 4,4'-dimethyl benzophenone and di benzoyl methane. Examples of the aromatic hydrocarbon compound include p-acetotoluidine.

Specific examples of the stabilizer include: a hindered phenol compound such as 2,2'-methylenebis(4-methyl-6-t-butylphenol), 2,2'-methylidenebis(4-ethyl-6-t-butylphenol), 2,2'-ethylidenebis(4,6-di-t-butylphenol), 4,4'-thiobis(2-methyl-6-t-butylphenol), 4,4'-butylidenebis(6-t-butyl-m-cresol), 1-[α-methyl-α-(4'-hydroxyphenyl) ethyl]-4-[α',α'-bis(4'-hydroxyphenyl) ethyl] benzene, 1,1,3-tris(2-methyl-4-hydroxy-5-cyclohexylphenyl) butane, 1,1,3-tris(2-methyl-4-hydroxy-5-t-butylphenyl) butane, tris(2,6-dimethyl-4-t-butyl-3-hydroxybenzyl) isocyanurate, 4,4'-thiobis(3-methylphenol), 4,4'-dihydroxy-3,3',5,5'-tetrabromodiphenylsulfone, 4,4'-dihydroxy-3,3',5,5'-tetramethyldiphenylsulfone, 2,2-bis(4-hydroxy-3,5-dibromophenyl) propane, 2,2-bis(4-hydroxy-3,5-dichlorophenyl) propane, or 2,2-bis(4-hydroxy-3,5-dimethylphenyl) propane; an epoxy compound such as 1,4-diglycidyloxybenzene, 4,4'-diglycidyloxydiphenylsulfone, 4-benzyloxy-4'-(2-methylglycidyloxy) diphenylsulfone, diglycidyl terephthalate, a cresol novolak type epoxy resin, a phenol novolak type epoxy resin, or a bisphenol A type epoxy resin; N,N'-di-2-naphthyl-p-phenylenediamine; sodium or a polyvalent metal salt of 2,2'-methylenebis(4,6-di-t-butylphenyl) phosphate; bis(4-ethyleneiminocarbonyl aminophenyl) methane, a urea urethane compound (Color developer UU, manufactured by Chemipro Kasei Co., Ltd., etc.); a crosslinking type diphenyl sulfone compound represented by formula (4), and a mixture thereof.

(4)

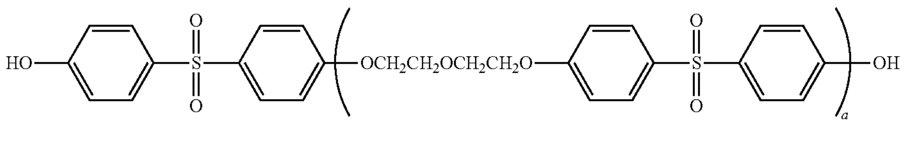

wherein, a represents an integer of 0 to 6.

Specific examples of the binder include: a water-soluble polymer such as methyl cellulose, methoxy cellulose, hydroxyethyl cellulose, carboxymethyl cellulose, sodium carboxymethyl cellulose, cellulose, polyvinyl alcohol (PVA), carboxyl group-modified polyvinyl alcohol, sulfonic acid group-modified polyvinyl alcohol, silyl group-modified polyvinyl alcohol, polyvinyl pyrrolidone, polyacrylamide, polyacrylic acid, starch and a derivative thereof, casein, gelatin, a water-soluble isoprene rubber, an alkali salt of a styrene/maleic anhydride copolymer, and an alkali salt of an iso (or diiso) butylene/maleic anhydride copolymer; and a hydrophobic polymer such as a (meth)acrylate copolymer, a styrene/(meth)acrylate copolymer, polyurethane, a polyester-based polyurethane, polyether-based polyurethane, polyvinyl acetate, an ethylene/vinyl acetate copolymer, polyvinyl chloride, a vinyl chloride/vinyl acetate copolymer, polyvinylidene chloride, polystyrene, a styrene/butadiene (SB) copolymer, a carboxylated styrene/butadiene (SB) copolymer, a styrene/butadiene/acrylic acid-based copolymer, an acrylonitrile/butadiene (NB) copolymer, a carboxylated acrylonitrile/butadiene (NB) copolymer, or composite particles of colloidal silica and a (meth)acrylic resin. These are usually utilized as emulsions.

Specific examples of the filler include calcium carbonate, magnesium carbonate, magnesium oxide, silica, white carbon, talc, clay, alumina, magnesium hydroxide, aluminum hydroxide, aluminum oxide, barium sulfate, a polystyrene resin, and a urea-formalin resin.

In an embodiment of the present invention, various additives other than those described above may be contained. Example of the additive include: a metal salt of a higher fatty acid such as zinc stearate or calcium stearate, which can be used for preventing the abrasion of thermal heads, or preventing sticking; an ultraviolet absorber such as a phenol derivative, a benzophenone-based compound, and a benzotriazole-based compound, which can be used for imparting an antioxidative or antiaging effect; various surfactants; and a defoaming agent.

Next, methods for preparing a thermosensitive recording material and a thermosensitive recording sheet according to the present invention will be described. A color-forming compound and a compound represented by general formula (1) are separately pulverized and dispersed, if necessary, with a binder or other additives by a dispersing machine such as a ball mill, an attritor, or a sand mill to prepare dispersions (usually water is used as a medium when pulverization or dispersion is performed in a wet manner). The dispersions are then mixed to prepare a coating liquid, and the coating liquid is applied onto a support such as paper (plain paper, high quality paper, coated paper, or the like can be used), a plastic sheet, or synthetic paper in such an amount as to usually provide a dry mass of 1 to 20 $g/m^2$ with a bar coater, a blade coater or the like, and dried to form a thermosensitive recording layer and thus a thermosensitive recording sheet.

If necessary, an intermediate layer may be disposed between the thermosensitive recording layer and the support, or an overcoat layer (protective layer) may be disposed on the thermosensitive recording layer. The intermediate layer and the overcoat layer (protective layer) can be formed, for example, by pulverizing and dispersing the binder, if necessary, together with other additives in a similar manner to the preparation of a coating liquid for the thermosensitive recording material to prepare a coating liquid for the intermediate layer or a coating liquid for the overcoat layer (protective layer), then applying the coating liquid in such an amount as to usually provide a dry mass of 0.1 to 10 g/m$^2$, and then drying the coating liquid.

EXAMPLES

Hereinafter, the present invention will be described more specifically with reference to Examples, but the present invention is not limited by the following Examples at all. In the Examples, "part" indicates part by mass, and "%" indicates % by mass.

[Synthesis Example 1] Synthesis of Compound No. 2 in Table 1 (See Non-Patent Literature 1)

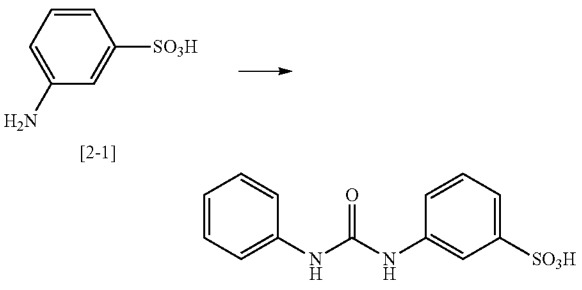

[2-1]

[2-2]

To 100 parts of DMF, 100.0 parts of 3-aminobenzenesulfonic acid [2-1] (Tokyo Chemical Industry Co., Ltd.) was added and stirred, and then 69 parts of phenyl isocyanate (Tokyo Chemical Industry Co., Ltd.) was added dropwise thereto at room temperature. The mixture was stirred at the same temperature for four hours, and then the reaction liquid was added dropwise to 250 parts of water to precipitate crystals, thereby obtaining [2-2], Subsequently, 90 parts of phosphorus oxychloride (Tokyo Chemical Industry Co., Ltd.) was added dropwise thereto at 0° C., and the mixture was stirred at room temperature for 12 hours. Thereafter, 60 parts of phenol (Tokyo Chemical Industry Co., Ltd.) was added dropwise thereto at room temperature, 80 parts of potassium carbonate was slowly added thereto, and the mixture was stirred at room temperature for 12 hours. Thereafter, the reaction liquid was added dropwise to 200 parts of water to precipitate crystals, and the crystals were sequentially washed with dichloromethane and water and dried to obtain 200 parts of Compound No. 2 in Table 1 as a white solid.

MS(ESI): [M-H]$^-$: cal.: 381.4, found: 381.4.

[Example 1] Preparation of Thermosensitive Recording Material

Compound No. 2 presented in Table 1 obtained in Synthesis Example 1 was pulverized and dispersed in the following composition with a multi beads shocker (model: PV 1001(S)) manufactured by Yasui Kikai Corporation for one hour to prepare Liquid [A].

TABLE 2

| | |
|---|---|
| Liquid [A]: Compound No. 2 presented in Table 1 | 15 parts |
| 25% PVA aqueous solution | 20 parts |
| Water | 65 parts |

A mixture having the following composition was pulverized and dispersed using a Sandoz grinder such that a median particle diameter was 1 μm, which was obtained by a laser diffraction/scattering particle diameter distribution measuring apparatus LA-950 (manufactured by Horiba, Ltd.), to prepare Liquid [B] containing a color-forming compound.

TABLE 3

| | |
|---|---|
| Liquid [B]: 3-Dibutylamino-6-methyl-7-anilinofluoran | 35 parts |
| 15% PVA aqueous solution | 40 parts |
| Water | 25 parts |

Subsequently, the liquids obtained above and the following components were mixed at the following composition to prepare a thermosensitive recording material coating liquid. The coating liquid was applied at a dry mass of 5 g/m$^2$ onto high quality paper having a basis weight of 50 g/m$^2$ and dried to form a thermosensitive recording layer.

TABLE 4

| | |
|---|---|
| Liquid [A] | 40.0 parts |
| Liquid [B] | 8.6 parts |
| 67% Calcium carbonate aqueous dispersion | 9.0 parts |
| 48% Modified styrene/butadiene copolymer latex | 6.3 parts |
| Water | 36.1 parts |

(Formation of Protective Layer)

Next, a protective layer coating liquid having the following composition was applied at a dry mass of 2 g/m$^2$ onto the above thermosensitive recording layer and dried to prepare a thermosensitive recording paper with a protective layer.

TABLE 5

| | |
|---|---|
| 40% Styrene/acrylate ester copolymer emulsion | 115 parts |
| 5% Bentonite aqueous dispersion | 17 parts |
| 45% Styrene/acrylic copolymer aqueous emulsion | 44 parts |
| 39% Zinc stearate aqueous dispersion | 103 parts |
| 67% Calcium carbonate aqueous dispersion | 15 parts |

Comparative Example 1

A comparative thermosensitive recording paper with a protective layer was obtained in a similar manner to Example 1 except that a mixture having the following composition was pulverized and dispersed with a Sandoz grinder such that a median particle diameter was 1 μm, which was obtained by a laser diffraction/scattering particle size distribution measuring apparatus LA-950 (Horiba, Ltd.), to prepare Liquid [C], and Liquid [C] was used in place of Liquid [A] in the composition of the thermosensitive recording layer coating liquid described in Example 1 above and the components were mixed at the following composition to prepare a thermosensitive recording material coating liquid.

TABLE 6

| | |
|---|---|
| Liquid [C]: Bisphenol S (Tokyo Chemical Industry Co., Ltd.) | 25 parts |
| 25% PVA aqueous solution | 20 parts |
| Water | 55 parts |

[Water Resistance Evaluation Test]

The thermosensitive recording papers obtained in Example 1 and Comparative Example 1 were printed at a pulse width of 1.2 msec using a thermal printer (TH-M2/PP) manufactured by Okura. Engineering Co., Ltd., and were then immersed in water at 25° C. for 24 hours. The Macbeth reflection density of a colored portion of each of the papers before and after the test was measured using a colorimeter manufactured by GRETAG-MACBETH, trade name "SpectroEye". The measurements were performed under the conditions of using Illuminant C as a light source, ANSI A as a density reference, and a viewing angle of 2 degrees. The results are shown in Table 7 below. It is to be noted that the higher a residual ratio is, the better water resistance is. The residual ratio was determined by the following expression (I).

Residual ratio (%)=(Macbeth reflection density of colored portion after test)/(Macbeth reflection density of colored portion before test)×100 (I)

TABLE 7

| Water resistance test | Example 1 | Comparative Example 1 |
|---|---|---|
| Residual ratio (%) | 100 | 76 |

As is apparent from Table 2 above, Example 1, in which a compound of the present invention was used as a color developing compound has a higher residual ratio than Comparative Example 1, in which bisphenol S described in Patent Literature 2 was used as a color developing compound, which evidences that the present invention is more excellent in water resistance of colored portions than the prior art.

[Heat Resistance Evaluation Test of Background]

The thermosensitive recording papers obtained in Example 1 and Comparative Example 1 were held at 90° C. for one hour in an air blowing constant temperature thermostat manufactured by Yamato Scientific Co., Ltd., trade name: DKN 402. ISO brightness degrees of a background before and after the test were measured using a colorimeter manufactured by GRETAG-MACBETH, trade name "SpectroEye". The measurements were performed under the conditions of using Illuminant C as a light source, ANSI A as a density reference, and a viewing angle of 2 degrees. Results are shown in Table 3 below. It is to be noted that the smaller an amount of change in the ISO brightness between before and after the test is, the better heat resistance of a background is.

TABLE 8

| Heat resistance test | | Example 1 | Comparative Example 1 |
|---|---|---|---|
| Background | Before test | 82.9 | 76.7 |
| | After test | 77.1 | 64.4 |
| | Amount of change | 5.8 | 12.3 |

As is apparent from Table 3 above, Example 1 using the color developing compound of the present invention has a small amount of change in the ISO whiteness before and after the heat resistance test. Therefore, it is found that Example 1 is superior in the heat resistance of the background to Comparative Example 1 using bisphenol S that is s a color developing compound described in Patent Literature 2.

The invention claimed is:

1. A thermosensitive recording material comprising a compound represented by general formula (1):

(1)

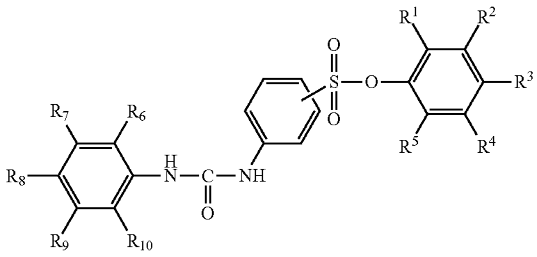

wherein, $R^1$ to $R^{10}$ each independently represent a hydrogen atom, a halogen atom, a nitro group, an amino group, an alkyl group, a hydroxy group, an alkoxy group, an aryl oxy group, an alkyl carbonyl oxy group, an aryl carbonyl oxy group, an alkyl carbonyl amino group, an aryl carbonyl amino group, an alkyl sulfonyl amino group, an aryl sulfonyl amino group, a mono-alkyl amino group, a dialkyl amino group, or an aryl amino group; and a color-forming compound.

2. The thermosensitive recording material according to claim 1, wherein the compound represented by general formula (1) is a compound represented by general formula (2):

(2)

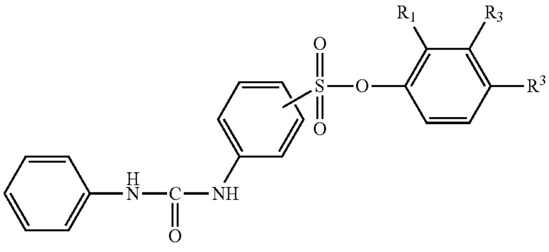

wherein, $R^1$ to $R^3$ are the same as defined above.

3. The thermosensitive recording material according to claim 1, wherein in general formula (2), $R^1$ to $R^3$ each independently represent a hydrogen atom or a methyl group.

4. The thermosensitive recording material according to claim 2, wherein in general formula (2), $R^1$ to $R^3$ each independently represent a hydrogen atom or a methyl group.

5. A thermosensitive recording sheet with a thermosensitive recording layer on a support, said thermosensitive recording layer comprising the thermosensitive recording material according to claim 1.

6. The thermosensitive recording sheet of claim 5, wherein said support comprises paper.

7. A thermosensitive recording sheet with a thermosensitive recording layer on a support, said thermosensitive recording layer comprising the thermosensitive recording material according to claim 2.

8. The thermosensitive recording sheet according to claim 7, wherein said support comprises paper.

9. A thermosensitive recording sheet with a thermosensitive recording layer on a support, said thermosensitive recording layer comprising the thermosensitive recording material according to claim 3.

10. The thermosensitive recording sheet according to claim 9, wherein said support comprises paper.

11. A thermosensitive recording sheet with a thermosensitive recording layer on a support, said thermosensitive recording layer comprising the thermosensitive recording material according to claim 4.

12. The thermosensitive recording sheet according to claim 11, wherein said support comprises paper.

* * * * *